United States Patent
Mueller

(10) Patent No.: US 10,755,127 B2
(45) Date of Patent: Aug. 25, 2020

(54) OPERATIVENESS TEST OF A DRIVER-ASSISTANCE SYSTEM

(71) Applicant: Robert Bosch GmbH, Stuttgart (DE)

(72) Inventor: Alexander Mueller, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 15/763,368

(22) PCT Filed: Aug. 11, 2016

(86) PCT No.: PCT/EP2016/069103
§ 371 (c)(1),
(2) Date: Mar. 26, 2018

(87) PCT Pub. No.: WO2017/059991
PCT Pub. Date: Apr. 13, 2017

(65) Prior Publication Data
US 2018/0276490 A1   Sep. 27, 2018

(30) Foreign Application Priority Data

Oct. 8, 2015   (DE) .................. 10 2015 219 496

(51) Int. Cl.
*G06K 9/00*   (2006.01)
*G06K 9/03*   (2006.01)
(Continued)

(52) U.S. Cl.
CPC ................ *G06K 9/03* (2013.01); *B60R 16/03* (2013.01); *G06K 9/00791* (2013.01); *G06K 9/209* (2013.01)

(58) Field of Classification Search
CPC ..... G06K 9/00791–00845; B60Q 1/525; B60Q 9/005; B60R 1/00; B60W 50/14; B62D 15/02; G05D 1/0246; G08G 1/00
See application file for complete search history.

(56) References Cited

U.S. PATENT DOCUMENTS 6,049,171 A  *  4/2000  Stam ................... B60Q 1/085
                                                  250/208.1
9,598,013 B2 *  3/2017  Oh ............................ B60R 1/00
(Continued)

FOREIGN PATENT DOCUMENTS

DE      19837160 A1    2/2000
DE      19957210 A1    5/2001
(Continued)

OTHER PUBLICATIONS

International Search Report dated Oct. 20, 2016, of the corresponding International Application PCT/EP2016/069103 filed Aug. 11, 2016.

*Primary Examiner* — Sean T Motsinger
(74) *Attorney, Agent, or Firm* — Norton Rose Fulbright US LLP; Gerard Messina

(57) ABSTRACT

A method for determining the operativeness of a driver-assistance system of a vehicle, in particular a motor vehicle. The driver-assistance system has at least one light sensor and at least one camera sensor, which are developed and/or aligned on the vehicle in order to detect at least essentially the same environment. It is provided that at least one first brightness value ascertained by the light sensor is compared to at least one second brightness value ascertained by the camera sensor, and that the operativeness of the driver-assistance system is determined by the comparison of the brightness values.

11 Claims, 2 Drawing Sheets

(51) Int. Cl.
*G06K 9/20* (2006.01)
*B60R 16/03* (2006.01)

(56) References Cited

U.S. PATENT DOCUMENTS

| | | | | |
|---|---|---|---|---|
| 9,610,891 B2* | 4/2017 | Yamada | ............... | B60Q 1/2665 |
| 2002/0196340 A1* | 12/2002 | Kato | ............... | B60R 1/00 |
| | | | | 348/148 |
| 2010/0013928 A1* | 1/2010 | Haug | ............... | B60R 1/00 |
| | | | | 348/148 |
| 2011/0135155 A1* | 6/2011 | Kudo | ............... | G06K 9/2054 |
| | | | | 382/104 |
| 2011/0254819 A1* | 10/2011 | Yamagishi | ............... | G09G 3/20 |
| | | | | 345/207 |
| 2012/0269382 A1* | 10/2012 | Kiyohara | ............... | G01C 21/26 |
| | | | | 382/103 |
| 2012/0330504 A1* | 12/2012 | Nelson | ............... | B60R 1/12 |
| | | | | 701/36 |
| 2014/0168288 A1* | 6/2014 | Tusch | ............... | G09G 5/00 |
| | | | | 345/690 |
| 2015/0016678 A1* | 1/2015 | Imaeda | ............... | B60W 30/095 |
| | | | | 382/103 |
| 2015/0036037 A1* | 2/2015 | Reed | ............... | G03B 17/02 |
| | | | | 348/340 |
| 2015/0219809 A1* | 8/2015 | Ruhnau | ............... | H04N 5/35563 |
| | | | | 348/360 |
| 2015/0360612 A1* | 12/2015 | Lee | ............... | B60R 1/00 |
| | | | | 348/148 |
| 2016/0007018 A1* | 1/2016 | Ooi | ............... | G06T 7/0002 |
| | | | | 348/187 |
| 2016/0119586 A1* | 4/2016 | Riad | ............... | H04N 7/183 |
| | | | | 348/148 |
| 2016/0198151 A1* | 7/2016 | Schmid | ............... | H04N 7/183 |
| | | | | 348/148 |
| 2017/0007459 A1* | 1/2017 | Deng | ............... | B60R 1/00 |
| 2017/0136962 A1* | 5/2017 | Morita | ............... | H04N 13/239 |
| 2018/0105039 A1* | 4/2018 | Yeomans | ............... | B60K 28/04 |
| 2018/0276490 A1* | 9/2018 | Mueller | ............... | B60R 16/03 |
| 2019/0149813 A1* | 5/2019 | Sun | ............... | H04N 17/002 |

FOREIGN PATENT DOCUMENTS

| | | | |
|---|---|---|---|
| DE | 102004049558 A1 | | 4/2006 |
| DE | 102007061725 A1 | | 6/2009 |
| DE | 102014002134 A1 | | 9/2014 |
| EP | 1323579 A2 | | 7/2003 |
| EP | 2050637 A2 | | 4/2009 |
| JP | 2001199260 A | | 7/2001 |
| JP | 2002324235 A | | 11/2002 |
| JP | 2005033680 A | * | 2/2005 |
| JP | 2005033680 A | | 2/2005 |
| JP | 2005338266 A | | 12/2005 |
| JP | 2008070616 A | | 3/2008 |
| JP | 2010140171 A | | 6/2010 |
| JP | 2010140171 A | * | 6/2010 |
| JP | 2010199260 A | | 9/2010 |
| JP | 2010251613 A | | 11/2010 |
| JP | 2011121490 A | | 6/2011 |

* cited by examiner

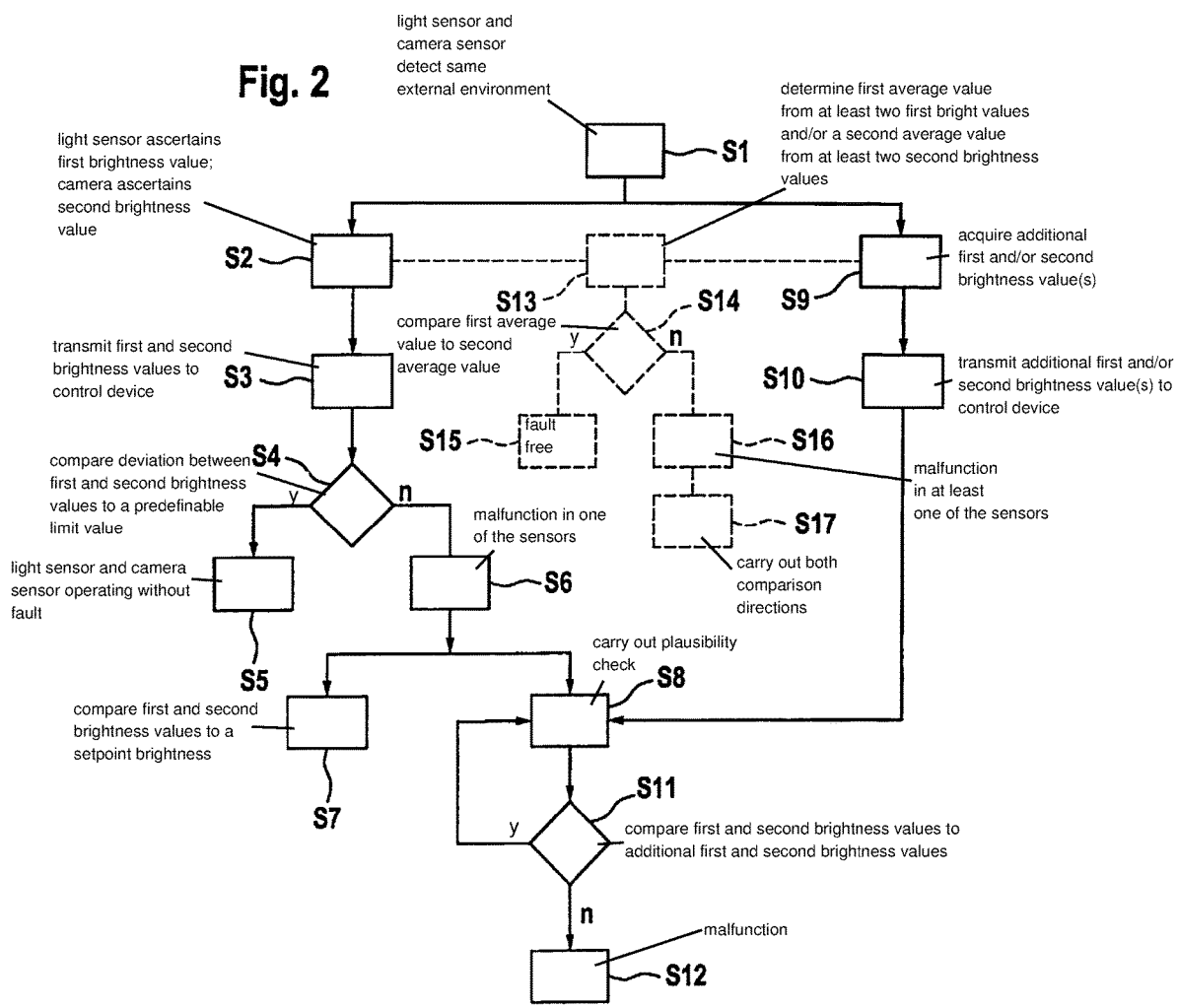

OPERATIVENESS TEST OF A DRIVER-ASSISTANCE SYSTEM

FIELD

The present invention relates to a method for determining the operativeness of a driver-assistance system of a vehicle, in particular a motor vehicle. The driver-assistance system has at least one light sensor and at least one camera sensor, which are developed and/or aligned on the vehicle in order to detect at least essentially the same environment.

In addition, the present invention relates to a device for executing the present method, to a driver-assistance system having such a device, and to a motor vehicle.

BACKGROUND INFORMATION

Current motor vehicles are increasingly equipped with light sensors and camera sensors, which are used for detecting an external and internal environment. For example, light sensors are usually mounted in a frontal region of the vehicle, in particular behind an upper part of a windshield, in order to check the light conditions of the external environment of the vehicle. With the aid of the check and an analysis of the data supplied by the light sensor or the camera sensor, in particular with the assistance of a control device, an illumination device of the vehicle, in particular headlights, will then be activated. Camera sensors, which detect a distance to a vehicle driving ahead, for instance, are also mounted in a frontal region of the vehicle. As a result, the detection of the external and/or internal environment provides information to a driver-assistance system as to whether a danger is looming in the traffic scenario, e.g., whether an activation of the headlights is required, or whether a driver is distracted or tired. In applications that focus on the safety of the vehicle passengers, the operativeness of the light sensors and the camera sensors, and thus the operativeness of the driver-assistance system, is of great importance.

SUMMARY

According to the present invention, at least one first brightness value, which is ascertained by the light sensor, is compared to at least one second brightness value, which is ascertained by the camera sensor, and the operativeness of the driver-assistance system is determined by comparing the brightness values. An example method according to the present invention may have an advantage that the determination of the operativeness of the driver-assistance system is based on means that already exist in the vehicle. It is therefore not necessary to use additional test devices for the light sensor and/or the camera sensor. It should be assumed that light sensors and/or camera sensors ascertain the same or similar brightness values when they are positioned and/or aligned to detect the same environment, in particular a region of the same environment, and when the sensors operate without a fault. A deviation in the brightness values will thus occur in particular when a fault-free operation no longer exists. For an execution of the present method, the light sensor is preferably compared to the camera sensor, and the first brightness value is used as the reference value. As an alternative, it is also possible to compare the camera sensor to the light sensor, in which case the second brightness value is chosen as the reference value. Depending on the external environment, the more plausible brightness value is preferably determined as the reference value. For instance, if the light sensor registers a reduction in the first brightness value when entering a tunnel on a sunny day, while the second brightness value of the camera sensor remains unchanged, then a malfunction of the camera sensor will be inferred.

According to one preferred further refinement of the present invention, a first characteristic of first brightness values of the light sensor, recorded temporally one after the other, and a second characteristic of second brightness values of the camera sensor, recorded temporally one after the other, are ascertained and compared to each other in order to determine the operativeness of the driver-assistance system. The advantage of this specific embodiment is that the operativeness of the driver-assistance system is inferred as long as the first characteristic and the second characteristic are identical or similar. For instance, when entering or exiting a tunnel on a sunny day, it is to be assumed that the light sensor and the camera sensor will respond to a change from light to dark or from dark to light in such a way that the first characteristic and the second characteristic especially have a similar gradient or at least a similar direction of the gradient. A considerable deviation between the characteristics indicates a malfunction of the light sensor or the camera sensor. The characteristic that is the more plausible as a function of the external environment is preferably determined as the reference characteristic.

When comparing the characteristics, the operativeness of the driver-assistance system is preferably identified only if the characteristics have an at least essentially identical gradient change at the same time. The advantage of this specific embodiment is that an operativeness is inferred especially only if the gradient changes of the characteristics point in the same direction and feature the same or virtually the same gradient. If a brightness change is interpreted differently by both sensors, i.e., if a first gradient, which corresponds to a reference gradient in the example, is determined on the part of the light sensor that deviates from a second gradient of the camera sensor, for instance, then it is determined that the camera sensor is not functioning properly.

It is especially preferred that the detected brightness values of at least two light sensors and/or at least two camera sensors are compared to one another, and if a mutual deviation of the detected brightness values greater than a predefinable limit value is detected during the comparison, then a malfunction will be detected. The advantage of this specific embodiment of the present method is that the light sensors are in particular compared independently of the camera sensors, and vice versa. If two first brightness values of two light sensors are present, for instance, and if their deviation from each other is below the limit value, the operativeness of the light sensors is inferred. In the other case, if the deviation lies above the limit value, a third first brightness value is preferably used for a comparison. If this third brightness value is essentially in agreement with one of the first two brightness values, i.e. if the mutual deviation is below a limit value, then it will be concluded that a malfunction has occurred in the light sensor whose detected brightness value is not in agreement with the brightness values of the two others. According to one further advantageous specific embodiment of the present method, it is also possible to compare two first brightness values and two second brightness values to one another. If the deviation of two first brightness values and one of the two second brightness values is below the limit value, it may be concluded on this basis that the particular second brightness value that deviates from the three other brightness values is ascertained by the sensor that has encountered a malfunction. Additional preferred specific embodiments relate to a comparison of at least two first brightness values to at least one second brightness value or to a comparison of at least one first brightness value to at least two second brightness values. Because of the limit value, it is taken into account that a lower, in particular production-related, deviation between two similar sensors with regard to sensor-specific parameters, e.g., the sensitivity or the response time, will not be detected as a malfunction.

According to one preferred further refinement of the present invention, it is provided that the first brightness value is determined from the first brightness values simultaneously detected by at least two light sensors that are aligned for detecting the same environment. The advantage of this specific development is that a slight, in particular production-related, deviation that exists between at least two individual first brightness values is compensated for by the determination of the first brightness value, in particular in the form of a first average value. The first average value is preferably compared to a second brightness value of a camera sensor or to a second brightness value that is formed from at least two camera sensors.

Especially preferably, the second brightness value is determined from the second brightness values simultaneously detected by at least two camera sensors that are aligned to detect the at least essentially same environment. The advantage of this specific embodiment is that a slight, in particular production-related, deviation that exists between at least two individual second brightness values is compensated for by the determination of the second brightness value, in particular a second average value. The second average value is preferably compared to a first brightness value of a light sensor or to a first brightness value that is formed from at least two light sensors. The first average values and the second average values are preferably compared to one another.

According to one preferred further refinement of the present invention, a setpoint brightness is ascertained as a function of data from a satellite-based navigation system and/or an actual chronological time, and the first brightness value and/or the second brightness value is/are then compared to the setpoint brightness value in order to determine the operativeness of the driver-assistance system. The advantage of this specific embodiment is that it provides an additional brightness value, which is compared to the measured first and second brightness values. With the aid of the setpoint brightness value, the more plausible of a first and a second brightness value is determined, which then becomes the reference value. If, for example, the first brightness value and the setpoint brightness value are in agreement with each other during night driving but the second brightness value deviates therefrom, then it is inferred on that basis that a malfunction exists in the camera sensor due to the deviation of the second brightness value.

The present invention includes a device that is a specially configured control unit that executes the example method when used as intended. Additional advantages and preferred features are described herein.

The driver-assistance system according to the present invention includes a specially configured device, which executes the example method when used according to its intended purpose.

The vehicle according to the present invention, in particular the motor vehicle, includes the driver-assistance system mentioned above.

Below, the present invention is described in greater detail with the aid of an exemplary embodiment.

BRIEF DESCRIPTION OF THE DRAWINGS

FIG. 2 shows a flow diagram for determining the operativeness of light sensors and/or camera sensors.

DETAILED DESCRIPTION OF EXAMPLE EMBODIMENTS

Figure 1:
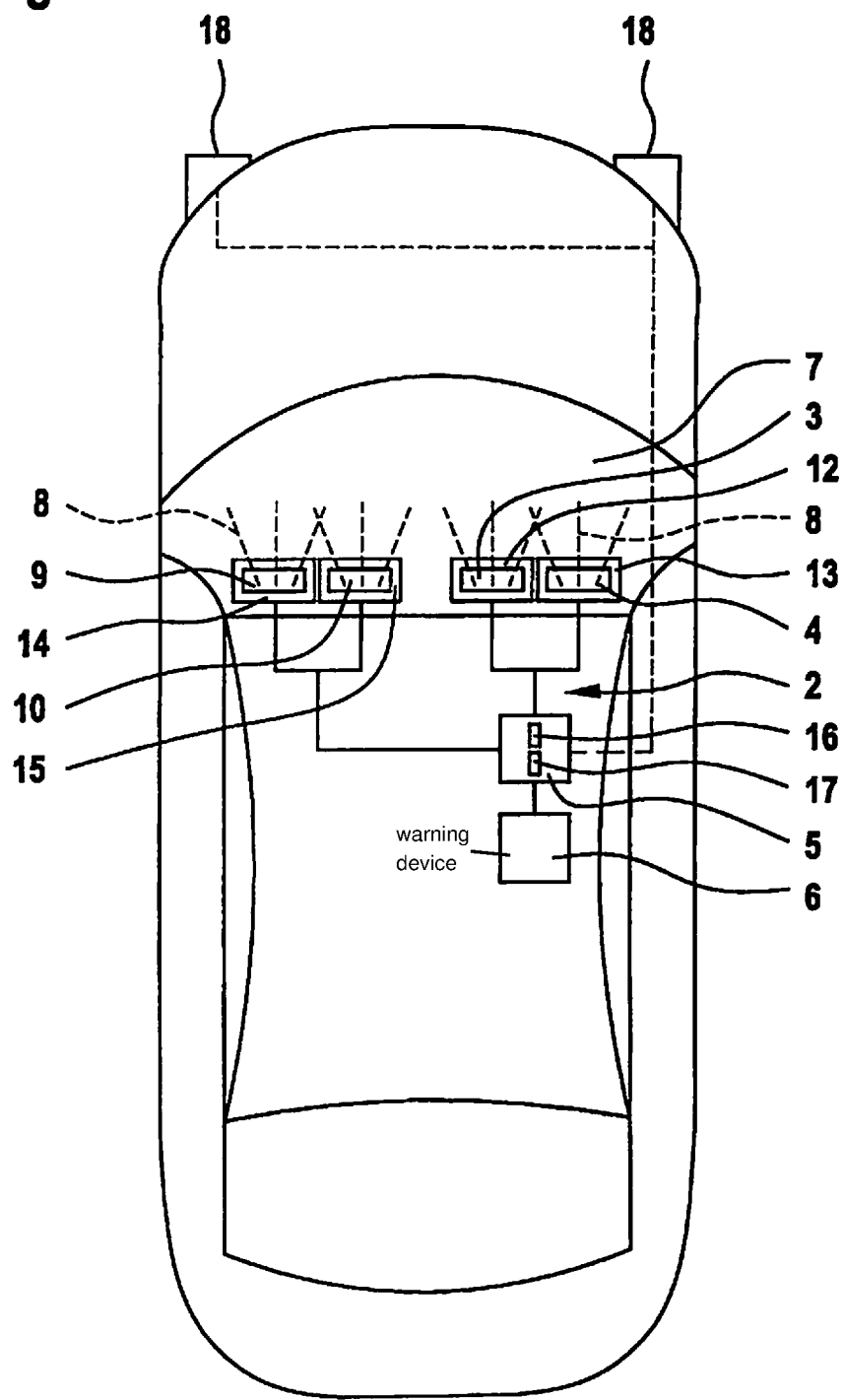
FIG. 1 shows a schematic representation of a vehicle having a driver-assistance system according to one exemplary embodiment.

FIG. 1 shows a simplified illustration of a vehicle 1 having a driver-assistance system 2. Driver-assistance system 2 installed in vehicle 1 has a light sensor 3, a camera sensor 4, and a control unit 5. Control unit 5 is connected to a warning device 6. Light sensor 3 and camera sensor 4 are installed on an inner side of a windshield 7 of vehicle 1 and point forward in straight-ahead driving. Light sensor 3 and camera sensor 4 are aligned in vehicle 1 in such a way that they detect the same or virtually the same external environment of vehicle 1, as indicated by dashed lines 8. Optionally, an additional light sensor 9 and an additional camera sensor 10 have been mounted on the inner side of windshield 7 so that they detect the same or virtually the same external environment of vehicle 1. Alternatively, light sensors 3 and 9 and camera sensors 4 and 10 may point toward the inside so that they detect an internal environment of vehicle 1. Light sensors 3, 9 and camera sensors 4, 10 are fixed in placed inside housings 12, 13, 14, 15.

Control device 5 has a control unit 16 and a memory 17, in particular a non-volatile memory 17. An illumination device 18 is connected to control device 5.

Light sensor 3 detects a first brightness value, and camera sensor 4 detects a second brightness value as a function of the external environment of vehicle 1. The first brightness value and the second brightness value are transmitted to control device 5. If control device 5 detects a decrease in the first brightness value or the second brightness value, a control intervention by driver-assistance system 2 usually takes place, for instance by an activation of illumination device 18. In this particular exemplary embodiment, camera sensor 4 is a CCD camera or a CMOS camera or also some other known means.

For the present development of the method, the first brightness value and the second brightness value are transmitted to control device 5 where they are compared to each other. To do so, at least one calculation process and one comparison process are carried out by control device 5. If the comparison process reveals a deviation between the first brightness value and the second brightness value, then an output of a warning signal by warning device 6 takes place, for example.

In the sequence for determining the operativeness of driver-assistance system 2 of vehicle 1, shown by way of example in FIG. 2, light sensor 3 and camera sensor 4 detect the same external environment in a first step S1. In a second step S2, light sensor 3 ascertains the first brightness value, and camera sensor 4 ascertains the second brightness value. In a third step S3, the ascertained first brightness value and the ascertained second brightness value are transmitted to control device 5, where they are compared to each other with the aid of a software algorithm, for instance.

In a fourth step S4, control device 5 compares a deviation between the first brightness value and the second brightness value to a predefinable limit value.

If the deviation between the first brightness value and the second brightness value is smaller than the limit value (y), then driver-assistance system 2 determines in a fifth step S5 that light sensor 3 and camera sensor 4 are operating without a fault.

If the deviation is greater than the limit value (n), then driver-assistance system 2 determines in a sixth step S6 that one of the sensors has encountered a malfunction.

In order to ascertain which one of the sensors has the malfunction, control device 5 carries out a plausibility check.

In doing so, the particular first brightness value or second brightness value that reproduces the light conditions of the external environment of vehicle 1 more precisely, and which is therefore more plausible, is determined as the reference value.

If only the first and the second brightness value are available, then the first and/or the second brightness value is/are compared to a setpoint brightness value in a seventh step S7. In this instance, the setpoint brightness value is ascertained as a function of data from a satellite-based navigation system, which detects the location, time of day and/or weather data.

For example, data with regard to the light conditions that prevail at certain times of the day at certain locations are retrieved from databases or from tables that are stored in control device 5 and to which control device 5 has access.

If the first brightness value of light sensor 3 and the setpoint brightness value are in agreement with each other, for example, but the second brightness value of camera sensor 4 and the setpoint brightness value are not, then it is determined, for one, that the first brightness value is the reference value and that, for another, camera sensor 4 is experiencing a malfunction.

On the other hand, for example, if the second brightness value of camera sensor 4 and the setpoint brightness value are in agreement but the first brightness value of light sensor 3 and the setpoint brightness value are not, then it is determined that the second brightness value is the reference value, on the one hand, and that light sensor 3 is experiencing a malfunction, on the other.

If more than just the first brightness value of light sensor 3 and/or the second brightness value of camera sensor 4 are available, control device 5 preferably carries out the plausibility check in an eighth step S8.

To do so, an additional first and/or an additional second brightness value is/are acquired in a ninth step S9 from additional light sensor 9 and/or from additional camera sensor 10. Additional light sensor 9 and additional camera sensor 10 are allocated to essentially the same external environment 8 of vehicle 1 and preferably operate in a redundant fashion with respect to light sensor 3 and camera sensor 4.

The additionally ascertained first brightness value and/or the additionally ascertained second brightness value is/are transmitted to control device 5 in a tenth step S10 and evaluated.

They are then made available for the plausibility check in step 8.

The plausibility check compares the first and/or the second brightness value to the additional first brightness value and/or the additional second brightness value in an eleventh step S11.

The brightness values of sensors that operate without a fault preferably exhibit a deviation that is smaller than the limit value (y).

If the deviation between two brightness values is greater than the limit value, then the malfunction is determined in a twelfth step S12 in the particular sensor whose brightness value deviates from each of the other brightness values (n).

For example, if the additional first brightness value corresponds to the first brightness value, then it is determined that additional light sensor 9 and light sensor 3 function without a fault. At the same time, driver-assistance system 2 thereby detects a malfunction of camera sensor 4.

For instance, if the additional second brightness value corresponds to the second brightness value, then it is determined that additional camera sensor 10 and camera sensor 4 operate flawlessly. At the same time, driver-assistance system 2 thereby determines a malfunction of light sensor 3.

If, for example, the additional second brightness value corresponds to the first brightness value, then it is determined that additional second camera sensor 10 and first light sensor 3 operate faultlessly. At the same time, driver-assistance system 2 thereby detects a malfunction of camera sensor 4.

This applies accordingly if the additional first brightness value corresponds to the second brightness value.

As an alternative to the comparison of the first brightness value to the second brightness value in step S3, control device 5 forms a first characteristic from first brightness values and a second characteristic from second brightness values and compares the first characteristic and the second characteristic, and in particular a first gradient of the first characteristic to a second gradient of the second characteristic.

If driver-assistance system 2 detects a considerable deviation between the characteristics during the comparison, such as a deviation from the predefinable limit value, then it infers a malfunction of one of the sensors.

In this context it is also possible that either a characteristic of setpoint brightness values is utilized for the comparison in order to determine the faulty sensor, or that an additional characteristic of first and/or second brightness values according to step 9 and step 10 is detected and formed by control device 5 and utilized for a comparison.

According to another exemplary embodiment, which hereinafter is shown by dashed lines, the first and/or second brightness values and/or the additional first and/or the additional second brightness values ascertained in S2 and S9 are jointly evaluated in control device 5 in a step S13. In particular, control device 5 preferably determines a first average value from at least two first brightness values and/or a second average value from at least two second brightness values.

If the first and the second average values are available, control device 5 compares the first average value to the second average value in a step S14. If the deviation between the two average values is less than the limit value (y), then it is determined in a step S15 that light sensors 3, 9 and camera sensors 4, 10, for example, function in a fault-free manner.

If the deviation is greater than the limit value (n), then driver-assistance system 2 determines in a step S16 that at least one of the sensors exhibits a malfunction.

The first average value is then preferably compared to a second brightness value or the second average value is compared to a first brightness value in order to determine the faulty sensor.

To describe the present method in an exemplary manner, the first average value in this instance is made up of the individual first brightness values A and B, and the second average value is made up of the individual second brightness values C and D. A and B are to be detected from correctly functioning light sensors 3, 9.

If the first average value deviates from the second average value, then at least one individual second brightness value C or D, but preferably each individual second brightness value C, D, is compared to the first average value according to the example.

A comparison of the second average value to at least one first brightness value A, B is naturally also possible.

If the first average value equals one of the second brightness values, i.e. if it is equal to C, for example, then it will be determined that both the light sensors 3, 9 and individual camera sensor 4 that detects second brightness value C are functioning without a fault.

If the deviation between the first average value and one of the second brightness values is greater than the limit value, i.e. the deviation of the first average value from D is greater than the limit value, for instance, then it will be determined that camera sensor 10 that detects second brightness value D is experiencing a malfunction.

If the second average value, which is formed from the individual second brightness values C and D, D being detected by a faulty camera sensor 10, is compared to each individual first brightness value A, B, then a deviation that is greater than the limit value is detected in each comparison.

Since according to the particular example, the faulty sensor is not detected in this way, control device 5 preferably carries out both comparison directions in a step S17. In doing so, both the first average value is compared to individual second brightness values and the second average value is compared to individual first brightness values, and the sensor featuring the malfunction is detected in this way.

According to this particular example, faulty camera sensor 4 is then determined, preferably after the afore-described comparison of the first average value to the individual second brightness values C, D.

It is optionally also possible to determine faulty camera sensor 4 through a comparison of second brightness values C, D to a setpoint brightness value according to step S7.

If second brightness values C, D are to be compared to individual additional first or second brightness values, then the determination of the faulty sensor takes place according to step S8, which was described earlier in the text. From a comparison of the average values, another comparison of the individual brightness values.

What is claimed is:

1. A method for determining operativeness of a driver-assistance system of a motor vehicle, the driver-assistance system having at least one light sensor and at least one camera sensor, which are developed on the vehicle to detect the at least essentially same environment, the method comprising:
    comparing a deviation between at least one first brightness value ascertained by the light sensor and at least one second brightness value ascertained by the camera sensor to a predetermined limit value;
    determining the operativeness of the driver-assistance system based on the comparison of the deviation to the predetermined limit value;
    determining, based on the comparing of the deviation to the predetermined limit value, that a malfunction exists in either the light sensor or the camera sensor;
    based on determining that the malfunction exists in either the light sensor or the camera, ascertaining a setpoint brightness value as a function of data from a satellite-based navigation system and/or a current chronological time;
    comparing the first brightness value and/or second brightness value to the setpoint brightness value; and
    determining which one of the light sensor or the camera sensor has the malfunction based on results of the comparing of the first brightness value and/or second brightness value to the setpoint brightness value.

2. The method as recited in claim 1, wherein a first characteristic of first brightness values of the light sensor, detected temporally one after the other, and a second characteristic of second brightness values of the camera sensor, detected temporally one after the other, are ascertained and compared to each other to determine the operativeness of the driver-assistance system.

3. The method as recited in claim 2, wherein the operativeness of the driver-assistance system is detected in the comparison of the first and second characteristics only if the first and second characteristics exhibit an identical gradient change at the same time.

4. The method as recited in claim 2, wherein detected brightness values of at least one of: (i) at least two light sensors, and (ii) at least two camera sensors, are compared to one another in each case, and when a deviation of the detected brightness values from one another that is less than a predefinable limit value is detected in the comparison, the operativeness of the driver-assistance system is detected.

5. The method as recited in claim 1, wherein the first brightness value is determined from a simultaneously detected first brightness values from at least two light sensors that are aligned for detecting the same environment.

6. The method as recited in claim 1, wherein the second brightness value is determined from the simultaneously detected second brightness values from at least two camera sensors that are aligned for detecting the same environment.

7. A method for determining operativeness of a driver-assistance system of a motor vehicle, the driver-assistance system having at least one light sensor and at least one camera sensor, which are developed on the vehicle to detect the at least essentially same environment, the method comprising:
    comparing a deviation between at least one first brightness value ascertained by the light sensor and at least one second brightness value ascertained by the camera sensor to a predetermined limit value; and
    determining the operativeness of the driver-assistance system based on the comparison of the deviation to the predetermined limit value;
    wherein the driver assistance system includes at least two light sensors, and the method further comprises:
    determining, based on the comparing of the deviation to the predetermined limit value, that a malfunction exists in either the light sensor or the camera sensor;
    acquiring an additional first brightness value from an additional light sensor;
    determining that the additional first brightness value is in agreement with the first brightness value; and
    based on determining that the additional first brightness value is in agreement with the first brightness value, determining that the camera has the malfunction and the light sensor is operating without a fault.

8. A driver-assistance system for a motor vehicle, comprising:

at least one light sensor and at least one camera sensor, which are developed on the vehicle for detecting the same environment; and a specially configured control device configured to compare a deviation between at least one first brightness value ascertained by the light sensor and at least one second brightness value ascertained by the camera sensor to a predetermined limit value, and determine the operativeness of the driver-assistance system based on the comparison of the deviation to the predetermined limit value;

wherein the specifically configured control device is further configured to:
  determine, based on the comparing of the deviation to the predetermined limit value, that a malfunction exists in either the light sensor or the camera sensor;
  based on determination that the malfunction exists in either the light sensor or the camera, ascertain a setpoint brightness value as a function of data from a satellite-based navigation system and/or a current chronological time;
  compare the first brightness value and/or second brightness value to the setpoint brightness value;
  determine which one of the light sensor or the camera sensor has the malfunction based on results of the comparing of the first brightness value and/or second brightness value to the setpoint brightness value.

9. The method as recited in claim 7, wherein a setpoint brightness value is ascertained as a function of at least one of data from a satellite-based navigation system and a current chronological time, and at least one of the first brightness value and the second brightness value is compared to the setpoint brightness value to determine the operativeness of the driver-assistance system.

10. A method for determining operativeness of a driver-assistance system of a motor vehicle, the driver-assistance system having at least one light sensor and at least one camera sensor, which are developed on the vehicle to detect the at least essentially same environment, the method comprising:
  comparing a deviation between at least one first brightness value ascertained by the light sensor and at least one second brightness value ascertained by the camera sensor to a predetermined limit value; and
  determining the operativeness of the driver-assistance system based on the comparison of the deviation to the predetermined limit value;
  wherein the driver assistance system includes at least two camera sensors, and the method further comprises:
    determining, based on the comparing of the deviation to the predetermined limit value, that a malfunction exists in either the light sensor or the camera sensor;
    acquiring an additional second brightness value from an additional camera sensor;
    determining that the additional second brightness value is in agreement with the second brightness value; and
    based on determining that the additional second brightness value is in agreement with the second brightness value, determining that the light sensor has the malfunction and the camera sensor is operating without a fault.

11. A method for determining operativeness of a driver-assistance system of a motor vehicle, the driver-assistance system having at least one light sensor and at least one camera sensor, which are developed on the vehicle to detect the at least essentially same environment, the method comprising:
  comparing a deviation between at least one first brightness value ascertained by the light sensor and at least one second brightness value ascertained by the camera sensor to a predetermined limit value;
  determining the operativeness of the driver-assistance system based on the comparison of the deviation to the predetermined limit value;
  acquiring at least one additional first brightness value from the light sensor and at least one additional second brightness value from the camera;
  determining an average first brightness value by averaging the first brightness value together with the at least one additional first brightness value;
  determining an average second brightness value by averaging the second brightness value together with the at least one additional second brightness value;
  comparing the average first brightness value and the average second brightness value to each other;
  comparing a deviation between the average first brightness value and the average second brightness value to the predetermined limit value; and
  determining operativeness of the light sensor and the camera based on the comparison of the deviation to the predetermined limit value.

* * * * *